US009284382B2

(12) United States Patent
Chen et al.

(10) Patent No.: US 9,284,382 B2
(45) Date of Patent: Mar. 15, 2016

(54) APPARATUS FOR CONTINUOUSLY PROCESSING LIGNOCELLULOSIC MATERIAL

(71) Applicant: Institute of Nuclear Energy Research, Atomic Energy Council, Executive Yuan, R.O.C., Taoyuan County (TW)

(72) Inventors: Wen-Hua Chen, New Taipei (TW); Pei-Yuan Tsai, Nantou County (TW); Ching-Jui Lo, Taoyuan County (TW); Chien-Hsien Huang, Taoyuan County (TW); Sheng-Shieh Chen, Taoyuan County (TW); Yong-Yan Xu, Taoyuan County (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 485 days.

(21) Appl. No.: 13/889,662

(22) Filed: May 8, 2013

(65) Prior Publication Data

US 2014/0109897 A1 Apr. 24, 2014

(30) Foreign Application Priority Data

Oct. 24, 2012 (TW) .............................. 101139381 A

(51) Int. Cl.
*C08B 1/00* (2006.01)
*C08H 8/00* (2010.01)

(52) U.S. Cl.
CPC ...... *C08B 1/00* (2013.01); *C08H 8/00* (2013.01)

(58) Field of Classification Search
CPC ..................................... C08B 1/00; C08H 8/00
See application file for complete search history.

(56) References Cited

U.S. PATENT DOCUMENTS

| 6,419,788 B1 * | 7/2002 | Wingerson | D21C 1/02 127/37 |
| 8,057,639 B2 * | 11/2011 | Pschorn | D21B 1/36 127/1 |
| 2010/0056774 A1 * | 3/2010 | Anand | C08H 8/00 422/232 |

* cited by examiner

*Primary Examiner* — David A Reifsnyder
(74) *Attorney, Agent, or Firm* — Jackson IPG PLLC; Demian K. Jackson

(57) ABSTRACT

Disclosed is an apparatus for continuously processing a lignocellulosic material, and particularly to an apparatus for continuously processing a lignocellulosic material by using of a single-stage or two-stage pretreatment processing with related to the acid-catalyzed steam explosion processing combined with dilute acid hydrolysis and steam explosion, in which parameters are adjusted to maintain in a state where lignocellulosic material feeding, acid mixing pre-heating, dilute acid hydrolysis reaction, steam explosion and flash discharge, to solid and liquid separation are simultaneously and continuously operated, so as to achieve in the results of acquiring xylose hydrolyzate by hydrolyzing hemicellulose, destroying lignocellulosic material structure, increasing surface area and porosity.

15 Claims, 4 Drawing Sheets

APPARATUS FOR CONTINUOUSLY PROCESSING LIGNOCELLULOSIC MATERIAL

FIELD OF THE INVENTION

The present invention is related to an apparatus for continuously processing lignocellulosic material, and particularly to an apparatus for continuously processing lignocellulosic material by using of a single-stage or two-stage pretreatment processing with parameters adjustment to maintain in a state where lignocellulosic material feeding, acid mixing pre-heating, dilute acid hydrolysis, steam explosion, to solid and liquid separation actions are simultaneously and continuously operated, so as to achieve in the results of acquiring xylose hydrolysate by hydrolyzing hemicellulose, destroying the structure of the biomass material, increasing surface area and porosity.

DESCRIPTION OF THE RELATED ART

In recent years, since the global fossil fuel is facing possible exhaust and the sustainable development is being enthusiastically pursued, worldwide countries are all actively seeking alternative energy and resolutions for these purpose and reason. Among the alternatives and resolutions, the bioeconomy by using a biomass material and associated fine extract technology are thought of the best way to replace the conventional petrochemical-oriented economic.

For the issue of biofuel, cereal and sugar are the resource for producing bioethanol, but this technology is usually controversial since the global cereal, popcorn, soybean and wheat inventory is dramatically reduced, causing grain crops price to be constantly rising, namely, the adoption of the grain crops as the biofuel may potentially effect the staple food supply.

Since the resource of the biomass materials are modifying and changing, the technology for producing bio-chemical from sugar or starch needs to change correspondingly, Lignocellulosic materials are particularly attractive because they do not compete with food crops. Therefore, lignocellulosic biomass from the energy-capable crops, energy-capable forest tree and agriculture waste is thought of the potential material for producing biofuel and bio-based chemicals.

A lignocellulosic material primarily includes cellulose and hemicellulose at 60-80% and lignin at 15-25%. To further being converted into bioethanol or bio-based chemicals, the cellulose and hemicellulose are required to be previously converted into hexose $(CH_2O)_6$ and pentose $(CH_2O)_5$, respectively. In the overall process, the pretreatment process is to remove xylose from hemicelluloses and simultaneously destroy the structure of the biomass so that cellulose is more accessible to enzymatic hydrolysis, generally by an acid-alkaline process along with physical methods such crush, cooking and steam explosion, and still has a bottleneck needed to be overcome.

Among them, the dilute acid hydrolysis and steam explosion methods are more maturely developed and widely used in the industry.

The above mentioned pretreatment processing is usually performed at a high temperature and high pressure environment. Since a multitude of fibrous biomass materials have their particular characteristics, they are difficult to mix significantly with chemical agents such as dilute acid and may vary in their transport characteristics such as bulk density and viscosity as the different water contain and acid or heat process are applied. This results in carbonization, clog and bridging happening at the stages of the material feeding and discharging, conveying, reaction and separation, leading subsequently to failure of continuous and stable operations.

However, for sake of economic consideration, the carbonization, the clog and bridging phenomena needs to be overcome in the associated pretreatment process and apparatus, so that a simplified apparatus and continuous operations can be achieved and thus the production cost may be well reduced. Thus, the purpose of commercialization of cellulosic ethanol or biorefinery may be reached with the crucial part of the pretreatment process and apparatus well provided.

In general, biomass is traditionally processed via a batch processing method. The raw material is fed previously and then processed by apphorizontal heat and pressure, and explosion after reaction. However, the batch processing method is not only limited on the volume of its container, but also has an adverse effect on the processing speed of the fibrous material and a difficulty in material discharging. In summary, besides the consideration of uniform heating and mixing result, the limitation of the reaction volume, i.e. processing capacity, the post processing apparatus downstream to the large explosion amount of flashed steam has to bear the instant attack force of the processing volume. Viewed from this, the cost for fixing the gas waste issue is increased.

Now, a continuous pretreatment-stage lignocellulosic material processing and its apparatus is discussed. Such process and apparatus (Pschorn et al. (Andritz Co.)) suggested a method and system for performing pretreatment processing involving pre-hydrolysis and steam explosion (US patent application 2009/0221814 A1, Thomas Pschorn, Namshee Shin, Bertil Stromberg; SYSTEM AND METHOD FOR PREEXTRACTION OF HEMICELLULOSE THROUGH USING A STEAM EXPLOSION PRETREATMENT PROCESS), in which, weak acid and $SO_2$ and the like are employed first to extract a hemicellulose hydrolyzate, and a steam explosion action presents thereafter to acquire a slurry. Aside from this, Christensen (Inbicon A/S Co.) uses a hydrothermal pretreatment technology and an enzymatic hydrolysis liquefaction technology to convert the lignocellulosic material into cellulosic ethanol (US patent application 2012/0138246 A1, Boerge Holm Christensen, Lena Holm Gerlach; METHOD AND APPARATUS FOR CONVERSION OF CELLULOSIC MATERIAL TO ETHANOL). In this application, on the condition of a continuous operation, this apparatus is characterized in a pressure difference feeding device, which switches from a normal pressure to high pressure or from low pressure to high pressure, where the material feeding is performed by using a revolution valve or a plug screen feeder for paper manufacturing, in which the plug screen feeder usually causes fibrous material tightened to prevent the chemical agents and steam from easily diffusing into the material (US 2011/00308141 A1, Borge Holm Christensen; METHODS AND APPARATUSES FOR CONTINUOUS TRANSFER OF PARTICULATE AND/OR FIBROUS MATERIAL BETWEEN TWO ZONES WITH DIFFERENT TEMPERATURES AND PRESSURES). In addition, the steam explosion flash discharge device has the endurance and smooth discharging considerations, Vibe-Pedersen and Iversen suggested a flash discharge device (US patent application 2011/0147409 A1, Jakob Vibe-Pedersen, Frank Krogh Iversen; APPARATUS AND METHODS FOR DISCHARGING PRETREATED BIOMASS FROM HIGHER TO LOWER PRESSURE REGIONS), in which the final discharged material contains a 3-5% solid slurry is generally required for conveying, leading to a relatively low ratio of solid to liquid and a large water amount required. In this case, such apparatus can not be stably conveyed and operated under the condition of a high solid to liquid ratio.

In view of the drawbacks mentioned above, the inventor of the present invention provides an apparatus for continuously processing a lignocellulosic material, after many efforts and researches to make an improvement with respect to the prior art.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is a schematic block diagram of the apparatus according to a first embodiment the present invention;

DESCRIPTION OF THE PREFERRED EMBODIMENTS

Figure 1:
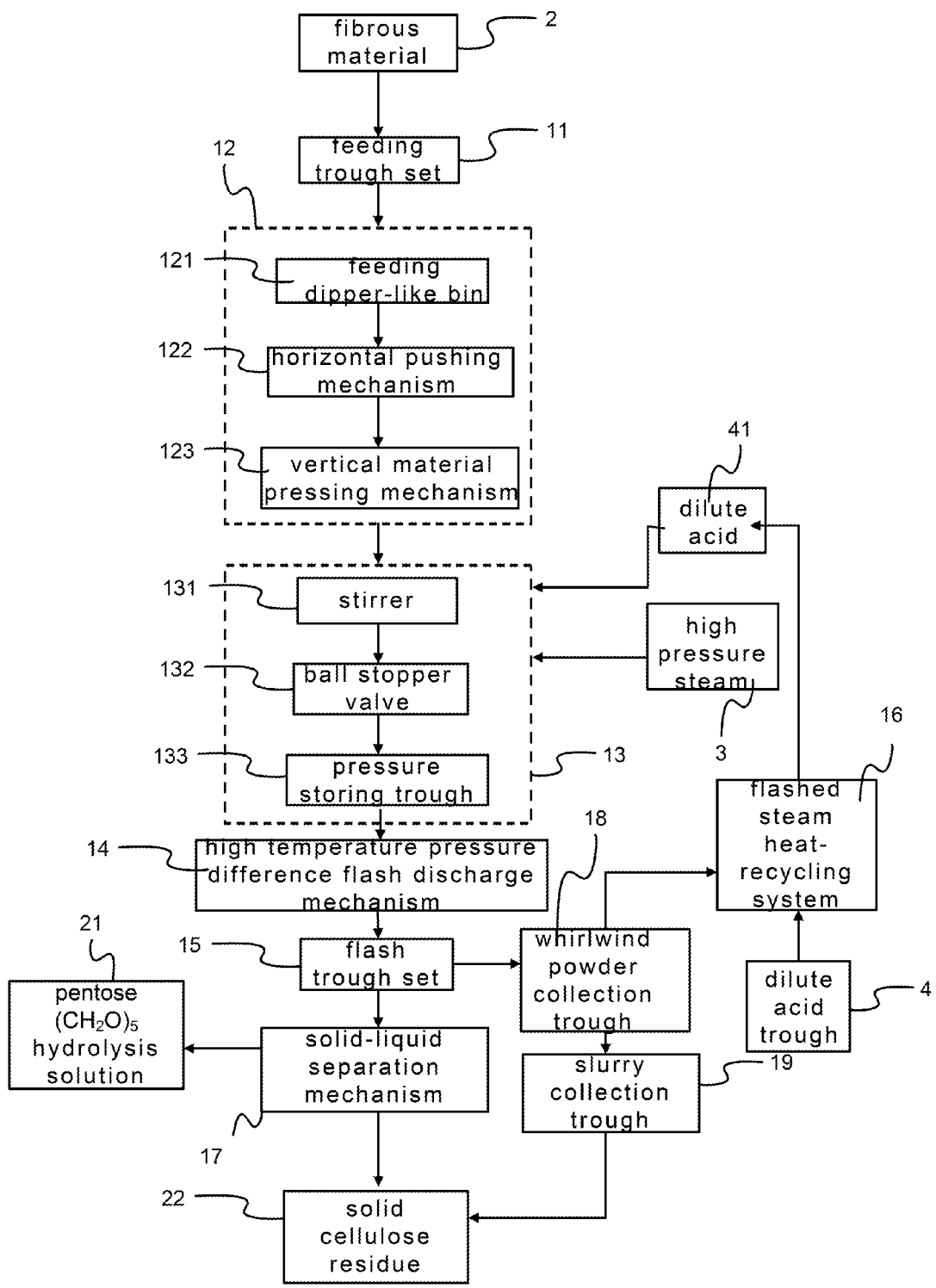

Referring to FIG. 1, a block diagram of an apparatus according to a first embodiment of the present invention is schematically shown therein. As shown, the apparatus for continuously processing a lignocellulosic material comprises a feeding trough set 11, a piston feeding device 12, a horizontal high temperature high pressure reactor set 13, a high temperature pressure difference flash discharge device 14, a flash trough set 15, a flashed steam heat-recycling 16, and a solid-liquid separation device 17.

The feeding trough set 11 includes a feeding trough, a bridging violator, a spiral conveyor and a meter (not shown).

The feeding trough set 12 is connected to the piston feeding device 11 and includes a feeding dipper-like bin 121, a horizontal pushing device 122 and a vertical pressuring device 123, connected in series from upstream to downstream. The horizontal pushing device 122 may be a barometric jar constant amount pushing device or a spiral conveyor constant delivering device.

The horizontal high temperature high pressure reactor set 13 includes a stirrer 131, at least two ball stopper valves 132 connected to the stirrer 131, and a pressure storing trough 133 connected to each of the ball stopper valves 132.

The high temperature pressure difference 14 is connected to a pressure storing trough 133 of the horizontal high temperature high pressure reactor set 13.

The flash trough set 15 is connected to the high temperature pressure difference 14.

The flashed steam heat-recycling system 16 is connected to the flash trough set 15. A cyclone powder collection trough 18 connected to a slurry collection trough 9 is arranged between the flash trough set 15 and the flashed steam heat-recycling system 16.

The solid-liquid separation device 17 is connected to the flash trough set 15.

In this embodiment, the apparatus is corresponding to a single-stage pretreatment process with respect to a lignocellulosic material. The lignocellulosic material 2 is first conveyed into the feeding trough set 11, in which a bridging violator violates bridges of the processed fibrous material 2, so that the processed fibrous material 2 may be stably conveyed by the piston feeding device 12 into the horizontal high temperature high pressure reactor set 13, along with a high pressure steam entering therein from its fore, middle and post parts of the reactor set 13, respectively, and heat the reactor set 13 to a designated temperature. At the same time, a dilute acid 41 is introduced at a constant amount from a dilute trough 4, in the horizontal high temperature high pressure reactor set 13, selectively from an entrance of the fore, middle or post parts of reactor set 13, respectively. When the dilute acid enters into the horizontal high temperature high pressure reactor set 13, it exchanges heat with the heated steam in the flashed steam heat-recycling system 16. As the diluted acid is heated, it goes into the horizontal high temperature high pressure reactor set 13.

In operation, the lignocellulosic material 2 is brought upwards by an agitation belt of the stirrer 131 from a bottom in the reactor set 13 and then drops down itself. With this design, acid mixing and pre-heating effects on the processed lignocellulosic material 2 may be well achieved to facilitate a dilute acid hydrolysis reaction. Accompanied with a control over the rotation speed of the stirrer 131, the retain time of the processed lignocellulosic material may be adjusted (may be at the same time provided with a designed blade for the stirrer 131 to meet the requirement of first-in-first-out of the processed fibrous material). After the dilute acid hydrolysis reaction, the constant amount of resulting product is conveyed into the pressure storing trough 133 by the ball stopper valve 132. Then, the ball stopper valve 132 is turned off to let the pressure storing trough 133 increase the pressure to a designated value. Subsequently, the high temperature pressure difference discharge device 14 is used to subject a steam explosion flash discharge action along with the operation of the flash trough set 15. Next, with the aid of cyclone powder collection trough 18 and the slurry collection trough 19, the discharged resulting product is subsequently conveyed to the solid-liquid separation device 17 to be squeezed and filtered. At this time, pentose $(CH2O)_5$ hydrolyzate 21 and solid cellulose residue 22 are acquired.

In the apparatus corresponding to this single stage processing, feeding of the lignocellulosic material 2, acid mixing and pre-heating, dilute acid hydrolysis, steam explosion flash discharge, to solid-liquid separation actions are performed simultaneously and continuously. Accordingly, the single stage process is a continuous lignocellulosic material process. The present invention may be used in many plant applications, such as rice straw, sugarcane residue, Japanese silvergrass, bamboo, napiergrass, and wheat straw. In the following, the sugarcane residue application will be described as an example.

In a preferred embodiment, a sugarcane fibrous material 2 is cut to have a proper size (<20 mm) and conveyed into the horizontal high temperature high pressure reactor set 13, and is subject to a high pressure saturated steam of 17 kg/cm$^2$ for heating control. The stirrer 131 is controlled in a designated rotation speed to let the processed fibrous material 2 within the high temperature high pressure reactor set 13 for a designated time. The processed fibrous material 2 is performed with acid mixing pre-heating and dilute acid hydrolysis at a designated temperature (160° C.) and then being explosion and flashed.

The resulting solid residue product is found to have hemicellulose (xylan) with a proportion of 8% reduced from 28% and cellulose (glucan) 56% promoted from 38% and have an enzymatic hydrolysis efficiency up to 75%. This indicates the sugarcane has, after the single-stage pretreatment process, 80% of its xylan dissolved out into the hydrolyzate and 5% of its glucan dissolved into the hydrolysis while a large portion thereof is still retained in the solid residue, which facilitates the enzymatic hydrolysis action.

Figure 2:
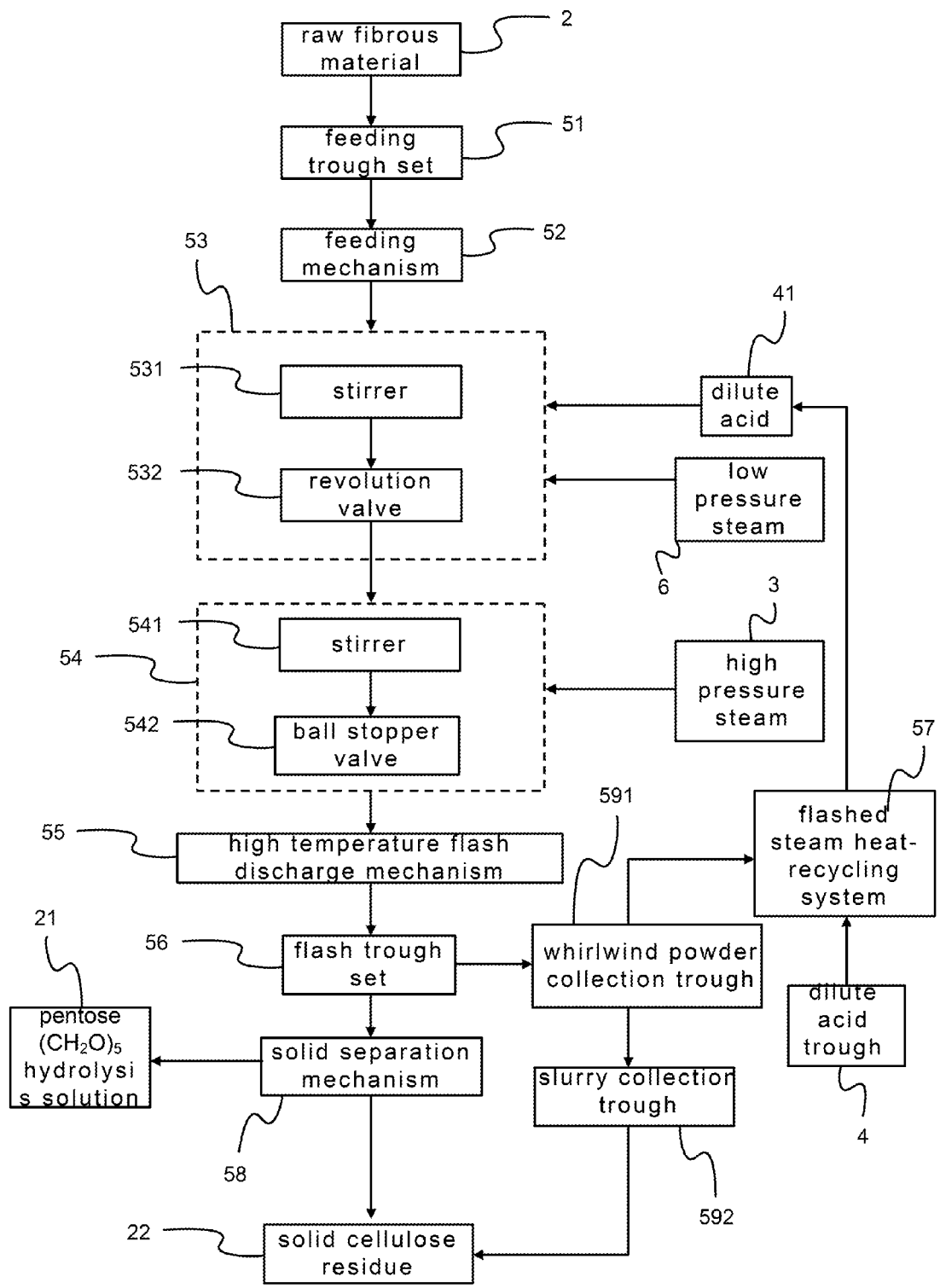
FIG. 2 is a schematic block diagram of the apparatus according to a second embodiment the present invention.
Figure 3:
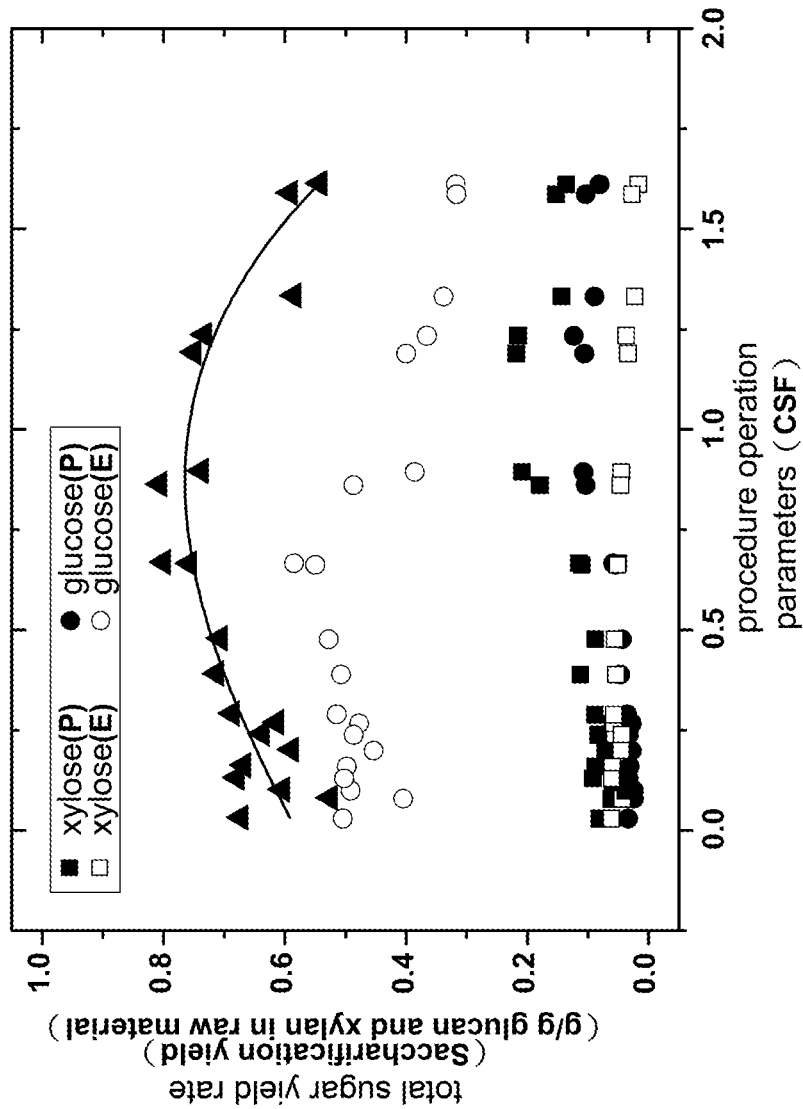
FIG. 3 is a schematic plot for showing a relationship between a total sugar yield rate of a hydrolyzate and procedure operation parameters according to the present invention.
Figure 4:
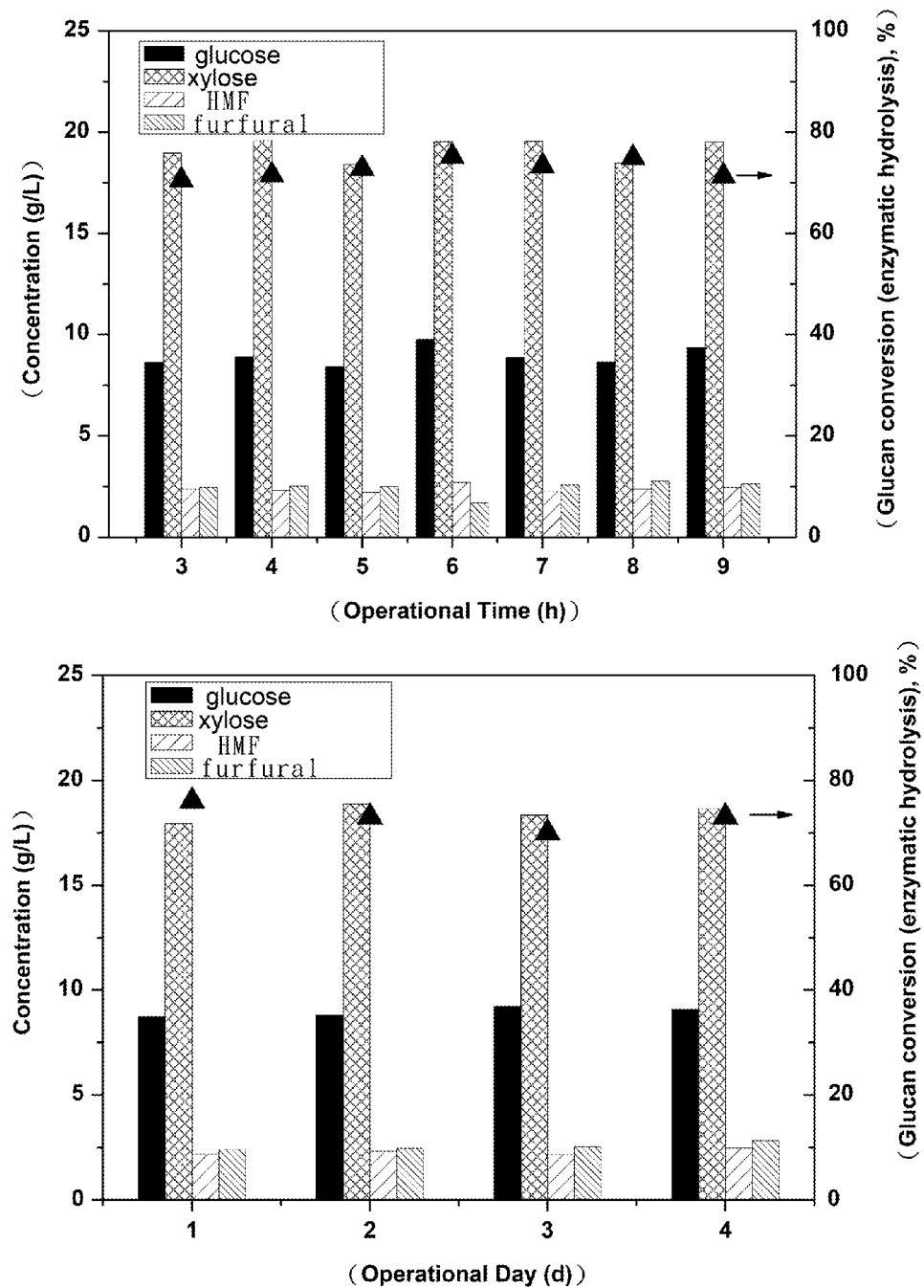
FIG. 4 is a schematic plot for showing a variation of a hydrolyzate concentration and enzymatic hydrolysis efficiency as an operational time and day change.

Referring to FIGS. 2, 3 and 4, a schematic block diagram of the apparatus according to a second embodiment the present invention, a schematic plot for showing a relationship between a total sugar yield rate of a hydrolyzate and procedure operation parameters according to the present invention, and a schematic plot for showing a variation of a hydrolyzate concentration and enzymatic hydrolysis efficiency as an operational time and day change, are presented respectively.

As shown, the apparatus for continuously processing a lignocellulosic material according to the second embodiment of the present invention, i.e. the apparatus corresponding to the dual-stage pretreatment processing, comprises: a feeding trough set 51, a feeding device 52, a horizontal low temperature low pressure acid mixing pre-heating set 53, a vertical high temperature high pressure reactor set 54, a high temperature pressure difference flash discharge device 55, a flash trough set 56, a flashed steam heat-recycling system 57, and a solid-liquid separation device 58.

The feeding device 51 includes a feeding trough, a bridging violator, a spiral conveyer and a meter (now shown).

The feeding device 52 is connected to the feeding trough set 51 and may be a piston feeding device or a revolution valve.

The horizontal low temperature low pressure acid mixing pre-heating set 53 is connected to the feeding device 52 and includes a stirrer 531 and a revolution valve 532 connected to the stirrer 531.

The vertical high temperature high pressure reactor set 54 is connected to the revolution valve 532 of the horizontal low temperature low pressure acid mixing pre-heating set 53, and includes a stirrer 541, a ball stopper valve 542 connected to the ball stopper valve 541.

The high temperature pressure difference flash discharge device 55 is connected to the ball stopper valve 542 of the vertical high temperature high pressure reactor set reactor set 54.

The flash trough set 56 is connected to the high temperature pressure difference flash discharge device 55.

The flashed steam heat-recycling system 57 is connected to the flash trough 56. A cyclone powder collection trough 591 is arranged between the flash trough set 56 and the flashed steam heat-recycling system 57 and connected to a slurry connection trough 592.

The solid-liquid separation device 58 is connected to the flash trough set 56.

In this embodiment, the apparatus is used in a dual-stage pretreatment process with respect to a lignocellulosic material. The lignocellulosic material 2 is first conveyed into the feeding trough set 11, in which a bridging violator violates bridges of the lignocellulosic material 2, so that the processed lignocellulosic material 2 may be stably conveyed by the feeding device 52 into the horizontal low temperature low pressure reactor set 53, along with a low pressure steam 6 entering therein from its fore, middle and post parts of the reactor set 53, respectively, and being heated to a designated temperature.

At the same time, a dilute acid 41 is introduced for a constant amount from a dilute trough 4, in the horizontal low temperature low pressure reactor set 5, selectively from an entrance of the fore, middle or post parts of reactor set 5, respectively. When the dilute acid 41 enters into the horizontal low temperature low pressure reactor set 53, it exchanges heat with the heated steam in the flashed steam heat-recycling system 57.

As the diluted acid is heated, it goes into the horizontal low temperature low pressure reactor set 53.

In operation, the lignocellulosic material 2 is brought upwards by an agitation belt 531 in the reactor set 13 and then drops down itself. With this design, acid mixing and pre-heating effects on the processed lignocellulosic material 2 may be well achieved to facilitate a dilute acid hydrolysis reaction. Accompanied with a control over the rotation speed of the stirrer 531, the retain time of the processed lignocellulosic material may be adjusted (may be at the same time provided with a designed blade for the stirrer 531 to meet the requirement of first-in-first-out of the processed lignocellulosic material).

Then, the dilute acid pre-heated lignocellulosic material 2 is conveyed into an exit of the horizontal low temperature low pressure acid mixing pre-heating set 53. Then, the ball stopper valve 532 continuously conveyed a constant amount of acid mixing pre-heated material into an exit of the vertical high temperature high pressure reactor set 54. Then, the ball stopper valve 532 is turned off and a high pressure steam 3 is activated from an entrance into and heat the reactor set 54 to a designated temperature to facilitate a dilute acid hydrolysis action.

Subsequently, the pressure within the high temperature high pressure reactor set 54 reaches a designated flashing pressure. Next, the ball stopper valve 542 of the high temperature high pressure reactor set 54 is opened. In the high temperature pressure difference flash discharge device 55, along with the flash trough 56, a steam explosion flash discharging action is performed. Next, with the aid of the cyclone powder collection trough 591 and the slurry collection trough 592, the discharged resulting product is subsequently conveyed to the solid-liquid separation device 58 to be squeezed and filtered. At this time, pentose $(CH_2O)_5$ hydrolyzate 21 and solid cellulose residue 22 are acquired.

Subsequently, a constant amount of the acid mixing pre-heated material is conveyed from the horizontal low temperature low pressure acid mixing pre-heating set 53 to within the high temperature high pressure reactor set 54, where a next batch of dilute acid hydrolysis and steam explosion flash discharge process is performed.

In the apparatus corresponding to this dual-stage processing, by means of switching between a horizontal low temperature low pressure acid mixing pre-heating set and a plurality of vertical high temperature high pressure reactor sets 54, feeding of the lignocellulosic material 2, acid mixing and pre-heating, dilute acid hydrolysis, steam explosion flash discharge, to solid-liquid separation actions are performed simultaneously and continuously. Accordingly, the single stage process is a continuous lignocellulosic material process in the apparatus. The present invention may be used in many plant applications, such as rice straw, sugarcane residue, Japanese silvergrass, bamboo, napiergrass, and wheat straw. In the following, the sugarcane residue application will be described as an example.

As shown in FIG. 3, a sugarcane lignocellulosic material 2 is cut to have a proper size (<20 mm) and conveyed into the horizontal low temperature low pressure acid mixing pre-heating set 53, with a feeding speed of 80-120 kg/h, a dilute acid 41, from a dilute trough 4 (at a concentration of 1.0-8.4% (w/w)) having a flow speed of 1.25-5.5 L/min, a proportional rate of the fed material and a solution of the dilute acid 41 controlled approximately as 35-35:100.

In this case, the dilute acid 41 may or may not exchange heat in the flash heat-recycling system 57. Correspondingly, the temperature of the dilute acid 41 may be the room temperature or 50-70° C. Next, a low pressure saturated steam of 6 kg/cm$^2$ is directly applied for control, with which the processed lignocellulosic material 2 is acid mixing pre-heated under 100-110° C. Next, the material is conveyed into the vertical high temperature high pressure reactor set 54, with a high pressure saturated stream 17 kg/cm$^2$ directly heating the reactor set 54 over control to a designated temperature of 160-190° C. After a designated time of 2-10 min, a explosion flashing action happens with the material.

After a solid-liquid separation action, a liquid containing richly pentose (CH$_2$O)$_5$ and resulting solid products containing richly cellulose and lignin are acquired. The resulting solid products containing richly cellulose and lignin may be hydrolyzed by cellulose and hemicellulose enzyme to acquire (CH$_2$O)$_6$ (glucose) and (CH$_2$O)$_5$ (xylose) in the solid residue.

In the present invention, the resulting total sugar yield rate may vary according to procedure operation parameters, which is a combined severity factor (CSF), formulated and calculated as:

$$CSF = \log R_0 - pH;$$

$$R_0 = t \cdot \exp[(T_H - T_R)/14.75],$$

wherein t is a reaction time, $T_H$ is a reaction temperature, TR is a reference temperature (100° C.), pH is a pH value of the resulting product, i.e. the hydrolyzate. When CSF is approximately 0.6-0.8, the total sugar yield rate may reach up to 80%.

Referring to FIG. 4, a result of a operational stability test with respect to a rice straw material 2 is processed, with the conditions of a flow rate of 2.5 L/min of 1.3% dilute acid 41, pre-heating mixing acid under 100-110° C., maintaining the material in the vertical high temperature high pressure reactor set 54 at 185° C. for 2 min for consecutive four days. As shown, the hydrolyzate has: xylose of a concentration 19.1±0.5 g/L, glucose 8.9±0.4 g/L, Hydroxymethylfurfural (HMF) 2.4±0.1 g/L, furfural 2.5±0.3 g/L, and solid residue enzyme efficiency 72.8±1.7%. Based on the conditions, the operation is continued for four days. As shown, the hydrolyzate has: xylose of a concentration 18.5±0.4 g/L, glucose 4.8±0.8 g/L, Hydroxymethylfurfural (HMF) 2.3±0.1 g/L, furfural 2.6±0.2 g/L, and solid residue enzymatic hydrolysis efficiency 73.0±2.1%. In view of the error for the four-day difference, it is indicated that the continuous operation provides a good stability under such operational condition.

By using the apparatus of the invention, the disadvantages presented on the prior art can be well overcome. In the inventive apparatus, a single-stage or two-stage pretreatment processing with related to the aid-catalyzed steam explosion processing combined with dilute acid hydrolysis and steam explosion are used to process a lignocellulosic material. By adjusting parameters, lignocellulosic material feeding, acid mixing pre-heating, dilute acid hydrolysis reaction, steam explosion and flash discharging actions, to solid and liquid separation actions can be simultaneously and continuously operated. Thus, the results of acquiring xylose hydrolyzate by hydrolyzing hemicellulose, destroying lignocellulosic material structure, increasing surface area and porosity are well achieved. Therefore, the present invention can be deemed as more practical, improved and necessary to users, compared with the prior art.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the appended claims.

What is claimed is:

1. An apparatus for continuously processing a lignocellulosic material comprises:
   a feeding trough set;
   a piston feeding device, connected to the feeding trough set so as to convey fibrous material from the feeding trough set;
   a horizontal high temperature high pressure reactor set, connected to the piston feeding device so as to receive the fibrous material, high pressure steam at fore, middle, and post parts of the horizontal high temperature high pressure reactor set, and dilute acid;
   a high temperature pressure difference flash discharge device, connected to the horizontal high temperature high pressure reactor set;
   a flash trough set, connected to the high temperature pressure difference discharge device;
   a flashed steam heat-recycling system connected to the flash trough set; and
   a solid-liquid separation device, connected to the flash trough set.

2. The apparatus as claimed in claim 1, wherein the piston feeding device includes a feeding dipper-like bin, a horizontal pushing device and a vertical pressing device connected in series from upstream to downstream.

3. The apparatus as claimed in claim 2, wherein the horizontal pushing device includes a barometric jar constant amount pushing device and a spiral conveyor constant delivering device.

4. The apparatus as claimed in claim 1, wherein the horizontal high temperature high pressure reactor set includes a stirrer, at least two ball stopper valves connected to the stirrer and a pressure storing trough connected to each of the ball stopper valves.

5. The apparatus of claim 4, wherein the high temperature pressure difference flash discharge device is connected to the pressure storing trough.

6. The apparatus as claimed in claim 1, further comprising a cyclone powder collection trough connected between the flash trough set and the flashed steam heat-recycling system and a slurry connection trough connected to the cyclone powder collection trough.

7. The apparatus of claim 1, wherein the horizontal high temperature high pressure reactor set selectively provides the dilute acid at fore, middle, or post parts of the horizontal high temperature high pressure reactor set.

8. An apparatus for continuously processing a lignocellulosic material comprises:
   a feeding trough set;
   a feeding device, connected to the feeding trough set so as to convey fibrous material from the feeding trough set;
   a horizontal low temperature low pressure acid mixing pre-heating set connected to the feeding device so as to receive the fibrous material, low pressure steam, and dilute acid;
   a vertical high temperature high pressure reactor set, connected to the horizontal low temperature low pressure acid mixing pre-heating set;
   a high temperature pressure difference flash discharge device connected to the vertical high temperature high pressure reactor set;
   a flash trough set, connected to the high temperature pressure difference discharge device;
   a flashed steam heat-recycling system connected to the flash trough set; and
   a solid-liquid separation device, connected to the flash trough set.

9. The apparatus as claimed in claim 8, wherein the feeding device includes a piston feeding device or a revolution valve.

10. The apparatus as claimed in claim 8, wherein the horizontal low temperature low pressure acid mixing pre-heating set includes a stirrer and a revolution valve connected thereto and to the vertical high temperature high pressure reactor set.

11. The apparatus as claimed in claim 8, wherein the vertical high temperature high pressure reactor set includes a stirrer and a ball stopper valve connected thereto and to the high temperature pressure difference flash discharge device.

12. The apparatus of claim 11, wherein the vertical high temperature high pressure reactor set is further connected to high pressure steam and wherein the ball stopper valve is turned off and the high pressure steam is admitted to the vertical high temperature high pressure reactor set to heat the vertical high temperature high pressure reactor set to a designated temperature.

13. The apparatus as claimed in claim 8, further comprising a cyclone powder collection trough connected between the flash trough set and the flashed steam heat-recycling system and connected to a slurry collection trough.

14. The apparatus of claim 8, wherein the horizontal low temperature low pressure reactor set provides the low pressure steam at fore, middle, and post parts of the horizontal low temperature low pressure reactor set.

15. The apparatus of claim 8, further comprising a dilute acid trough and wherein the horizontal low temperature low pressure reactor set selectively provides the dilute acid at fore, middle, or post parts of the horizontal high temperature high pressure reactor set.

* * * * *